(12) United States Patent
Vander Velde et al.

(10) Patent No.: US 8,269,667 B2
(45) Date of Patent: Sep. 18, 2012

(54) GPS-BASED ROLL RATE AND ROLL ANGLE MEASUREMENT IN THE ABSENCE OF JAMMING

(75) Inventors: Wallace E. Vander Velde, Winchester, MA (US); John H. Cafarella, Swampscott, MA (US); Huan-Wan Tseng, Westford, MA (US); George Dimos, Lexington, MA (US); Triveni N. Upadhyay, Concord, MA (US); Jianhui Luo, Westborough, MA (US)

(73) Assignee: Mayflower Communications Company, Inc., Burlington, MA (US)

( * ) Notice: Subject to any disclaimer, the term of this patent is extended or adjusted under 35 U.S.C. 154(b) by 0 days.

(21) Appl. No.: 13/373,494

(22) Filed: Nov. 16, 2011

(65) Prior Publication Data
US 2012/0068884 A1 Mar. 22, 2012

Related U.S. Application Data

(63) Continuation of application No. 12/454,306, filed on May 15, 2009, now Pat. No. 8,106,811.

(51) Int. Cl.
*G01S 19/53* (2010.01)
(52) U.S. Cl. ................................. 342/357.36
(58) Field of Classification Search ............. 342/357.36
See application file for complete search history.

(56) References Cited

U.S. PATENT DOCUMENTS

| | | | |
|---|---|---|---|
| 5,021,792 A | 6/1991 | Hwang | 342/357.31 |
| 5,101,356 A | 3/1992 | Timothy et al. | 701/213 |
| 5,185,610 A | 2/1993 | Ward et al. | 342/357.24 |
| 5,296,861 A | 3/1994 | Knight | 342/357.38 |
| 5,371,506 A | 12/1994 | Yu et al. | 342/380 |
| 5,543,804 A | 8/1996 | Buchler et al. | 342/357.23 |
| 5,600,326 A | 2/1997 | Yu et al. | 342/17 |
| 5,943,008 A | 8/1999 | Van Dusseldorp | 701/213 |
| 5,990,827 A | 11/1999 | Fan et al. | |
| 6,005,514 A | 12/1999 | Lightsey | 342/365 |
| 6,018,315 A | 1/2000 | Ince et al. | 342/357.27 |
| 6,020,854 A | 2/2000 | Jagnow et al. | 343/705 |
| 6,098,547 A | 8/2000 | West | 102/214 |
| 6,128,557 A | 10/2000 | Fenton et al. | 701/13 |
| 6,154,170 A | 11/2000 | Dentinger et al. | 342/357.36 |
| 6,520,448 B1 | 2/2003 | Doty et al. | 244/3.23 |

(Continued)

OTHER PUBLICATIONS

E. Glenn Lightsey and Jared Madsen, Journal of Guidance, Control, and Dynamics, vol. 26, No. 2, Mar.-Apr. 2003. All pages.

(Continued)

*Primary Examiner* — Harry Liu
(74) *Attorney, Agent, or Firm* — Kaplesh Kumar

(57) ABSTRACT

A system and method for determining the roll rate and roll angle of a spinning platform by using the measured phase and/or amplitude differences between the GPS satellite signals received on two or more antennas. The measured signal differences and the navigation solution from a GPS receiver are processed in a roll filter to obtain the desired information. Data from non-GPS measurement sources is optionally provided to update the navigation solution. Although of wide applicability, the invention is uniquely suited to the measurement of roll rates and roll angles of fast spinning platforms with small baselines in the presence as well as in the absence of jamming, and where the antennas are separated from each other by distances that are a fraction of the GPS signal wavelength.

44 Claims, 9 Drawing Sheets

U.S. PATENT DOCUMENTS

| | | |
|---|---|---|
| 6,573,486 B1 | 6/2003 | Ratkovic et al. .............. 244/3.2 |
| 6,598,009 B2 | 7/2003 | Yang ............................ 702/152 |
| 6,671,587 B2 | 12/2003 | Hrovat et al. .................... 701/1 |
| 6,779,752 B1 | 8/2004 | Ratkovic ...................... 244/3.15 |
| 6,825,804 B1 | 11/2004 | Doty ........................ 342/357.59 |
| 6,861,983 B2 | 3/2005 | Casabona et al. ............. 342/420 |
| 6,883,747 B2 | 4/2005 | Ratkovic et al. ............. 244/3.15 |
| 7,136,751 B2 | 11/2006 | Pinto et al. .................... 701/215 |
| 7,292,185 B2 * | 11/2007 | Whitehead et al. ...... 342/357.36 |
| 7,388,538 B1 | 6/2008 | Thompson, III ......... 342/357.36 |
| 7,852,964 B2 | 12/2010 | Rajappan et al. ............. 375/267 |
| 7,994,971 B2 | 8/2011 | Velde et al. ................... 342/357.37 |
| 2004/0164900 A1 | 8/2004 | Casabona et al. ............. 342/420 |
| 2004/0188561 A1 | 9/2004 | Ratkovic et al. ............. 244/3.15 |
| 2005/0197755 A1 | 9/2005 | Knowlton et al. .............. 701/50 |
| 2007/0032950 A1 | 2/2007 | O'Flanagan et al. ......... 701/214 |
| 2010/0289687 A1 | 11/2010 | Vander Velde et al. ......... 342/16 |

OTHER PUBLICATIONS

S. Purivigraipong, Thammasat Int. J. Sc. Tech., vol. 8, No. 1, pp. 44-53, Jan.-Mar. 2003. All pages.

R. T. Compton, Jr., "Adaptive Antennas," 1988, Prentice Hall.

I. S. Reed, J. D. Mallett, L. E. Brennan, IEEE Trans. on Aerospace & Electronic Systems, vol. ES-10, No. 6, pp. 853-863, Nov. 1974.

T. Kirubarajan and Y. Bar-Shalom, Proc. IEEE, vol. 92, No. 3, pp. 536-557, Mar. 2004.

* cited by examiner

GPS-BASED ROLL RATE AND ROLL ANGLE MEASUREMENT IN THE ABSENCE OF JAMMING

CROSS-REFERENCE TO RELATED APPLICATIONS

This application is a continuation of application Ser. No. 12/454,306, filed 15 May 2009 now U.S. Pat. No. 8,106,811. The patent application identified above is incorporated herein by reference in its entirety to provide continuity of disclosure.

This application is related to the commonly owned U.S. application Ser. No. 12/008,141, filed Jan. 9, 2008 (now U.S. Pat. No. 7,994,971) and titled "GPS-Based Measurement of Roll Rate and Roll Angle of Spinning Platforms," the subject matter of which is incorporated herein in its entirety by reference.

BACKGROUND OF THE INVENTION

The present invention deals generally with measurements in a continuously or intermittently jammed environment of the roll rate and roll angle of spinning platforms, including spinning projectiles, spin stabilized spacecraft, and other such vehicles, using the signals transmitted by the satellites of the Global Positioning System (GPS).

In the context of the invention herein, the terms "roll" and "spin" are used interchangeably and understood to mean the platform's rotation about its "roll" or "spin" axis at angular rates that include and exceed the zero roll rate. The words "platform," "vehicle," and "projectile" too are used interchangeably in this specification and must be interpreted as inclusive, so that the mention of one also means the mention of the others and similar like terms. The term GPS also is to be construed broadly, and includes not only GPS but all Global Navigation Satellite Systems (GNSS) using CDMA (Code Division Multiple Access) technology. The term "jamming" includes interference signals emitted by both narrowband and wideband jammers.

The focus on roll results from the fact that many projectiles aimed at a distant target do not require a full attitude reference system. If the projectile is stable under all flight conditions encountered, it may not require any stability augmentation about its two cross axes, pitch and yaw. Every guided platform, however, requires a measurement of its roll angle or roll rate, since this information helps relate the guidance commands, which are executed in the platform's body coordinates, to its location in space, which is identified in geographic coordinates.

The requirement for roll information on a guided projectile differs with the projectile configuration and its guidance concept. A fully controlled projectile is one that can correct its trajectory in both the downrange and cross-range directions. To do so, it must be able to generate lift in both the upward and lateral directions. This requires knowledge of which way is up and which way, for example, is to the right. The guidance corrections are relatively insensitive to the vehicle's elevation and azimuth Euler angles, but very sensitive to its roll angle. Reasonably accurate roll angle information is required. Since the command to lift the spinning projectile in a particular geographic direction is transformed into the projectile's body coordinates for execution by its control actuators, such as aerodynamic fins, this means that a fully controlled projectile—or at least that section of it that houses the control system—cannot be spinning faster than the bandwidth of its actuators.

Other methods of making downrange corrections to the platform's trajectory include adjusting the drag on the projectile. Limited corrections of cross-range may also be achieved by adjusting the projectile spin rate, which leverages the spinning projectile's natural tendency to drift in the lateral direction. This configuration requires a relatively high spin rate, typical of gun-launched projectiles. But these corrections do not require roll angle information—only roll rate is needed. So the usual requirement of the roll estimation system is either for roll angle at relatively low spin rate or for roll rate at relatively high spin rate.

Another application requiring reliable roll angle information is a spin stabilized spacecraft, which has well-controlled spin about one axis and very little motion about the other two.

Traditional methods of measuring roll rate and angle are expensive, and) can generally be justified only for very high value platforms. Inertial rate indicators, including MEMS (MEMS=Micro Electro Mechanical Systems) gyroscopes, are relatively expensive on this scale of costs. More importantly, they require calibration prior to use, which adds to the procurement cost. Magnetometers, likewise, are expensive, besides also being susceptible to interferences from local magnetic fields, such as from on-board electromagnetic actuators and other components. However, these traditional methods provide autonomous on-board guidance to the vehicle and are largely immune to effects of jamming.

For cost-effective performance, GPS, singly or in combination with other measurement techniques, continues to be investigated for determining roll and attitude of rotating platforms. GPS carrier phase and signal strength measurements are the two main techniques used for attitude determination. The preferred technique most commonly cited in the prior art for high accuracy applications is phase difference processing. This typically entails fixedly attaching an array of two or more antennas at different locations on a planar surface of the platform. The separation distances between the antennas, referred to in the art as baselines, typically exceed several wavelengths of the GPS signal. The carrier phase differences between the signals received on the antennas resulting from the spatial separations (or different pointing directions) of the antennas are exploited to determine the attitude of the vehicle.

The present invention is configured to use phase differences and/or amplitude differences to derive attitude information. Phase difference processing has been most popular in the prior art because it provides the most accurate measurement when the satellite signal is received with high carrier-to-noise ratio. The high sensitivity of phase measurement derives) from the relatively short wavelength of the L1 signal transmitted from the satellite. On the other hand, the amplitude of the signal degrades less quickly in the presence of interference. So there are good reasons to consider both phase and amplitude difference processing for the vehicle's reliable operation in the presence of jamming and determining its roll rate and roll angle. In fact, as shown herein, it is preferable to use both simultaneously to derive the greatest amount of information possible from the measured satellite signals. The phase and amplitude differences are related to the differences in path lengths from the GPS satellite to the antennas, and several such path length differences define the platform attitude.

Since, however, the prior art baselines are typically long compared to the GPS signal wavelength, accurate counts of the number of integer wavelengths in the received signal paths are required in the phase differencing approach (in addition to the fractional wavelength determinations) for calculating the true path lengths (and hence phases) of the signals reaching the respective antennas. Furthermore, GPS techniques employing long baselines are unsuited to attitude determination of spinning projectiles in the presence of jamming, as they require special custom antennae designs (and likely changes to the GPS receiver) while offering limited antijam performance.

A single antenna fixedly attached to the platform can also be used for determining roll rate or roll angle. (See e.g., U.S. Pat. No. 6,520,448) When the platform rotates, the GPS signal received at the single antenna shows time varying characteristics, which provides information for roll determination. The power or carrier phase of the signal received at the single antenna from the GPS satellite shows a modulation over the antenna's spin cycle, whose period is a measure of the vehicle spin rate. Also, the power of the received signal is maximum at the roll angle which orients the antenna boresight nearest to the Line of Sight (LOS) to the satellite. Since the direction to the satellite is known in Earth-fixed coordinates, this determines the roll angle of the platform. A single antenna system, however, is unable to perform in the presence of jamming or at zero spin rate. An antenna system for overcoming these limitations requires at least two antenna elements or two equivalent antenna modes, as herein disclosed.

A number of these prior art techniques using GPS signals alone have been applied to satellites and space vehicles for medium accuracy attitude determination, as low-cost alternatives to the more traditional and expensive methods employing star trackers and sun- or earth-sensors. The attitude environment of these platforms is relatively benign, since space vehicles are controlled to rotate very slowly. Even spin stabilized spacecraft typically rotate at only 1 or 2 Hz. For more dynamic applications, GPS-aided inertial attitude reference systems are employed. The inertial system accurately tracks fast and rapidly changing rotations, while GPS stabilizes the long-term bias drifts characteristic of inertial instrumentation.

An easily implemented and cost-effective solution is required for low cost projectiles operating in a jamming environment, with several spinning at very high rates (for example, 300 Hz or more). For projectile roll rate and roll angle measurements in the absence of jamming, such a solution based on phase differencing was disclosed recently in the co-pending and commonly owned U.S. patent application entitled "GPS-Based Measurements of Roll Rate and Roll Angle of Spinning Platforms," Ser. No. 12/008,141. The present invention builds upon the earlier development, and provides a similar cost-effective solution herein for measuring the projectile's roll Tate and roll angle in the presence of jamming. Although designed to provide accurate measurements in a jamming environment, the present invention also provides reliable measurements during periods when jamming is absent.

As before, the present invention nominally uses only GPS signals to measure the roll rate and roll angle of a stabilized or spinning vehicle, with standard GPS receiver hardware and augmented special purpose processing of the received GPS signals. The customary non-GPS attitude measurement sources, such as inertial instruments (gyroscopes and accelerometers) and magnetometers, are optionally provided within this approach to improve upon the navigation and roll solutions obtained purely through analysis of the GPS signal data. Although applicable to a wide range of rotating platforms with varying baselines, the present invention offers the much needed, but hitherto unavailable, cost-effective solution for measuring the roll rate and roll angle of small projectiles spinning at high rates in a jamming environment.

Also, as before, the present invention maintains visibility of the GPS satellites at all roll angles, using multiple antennas disposed on the platform's body about its spin axis preferably at or near a single location along its length. For small platforms, the spacing among the antennas is necessarily small, and may be a fraction of the GPS signal wavelength. The present invention not only computes the normal navigation solutions as to the platform's position and velocity, it also processes the received data in a unique way so as to suppress the interference signals from jamming and produce reliable measurements of vehicle roll angle and roll rate in a jamming environment.

Also, unlike the prior art amplitude- and phase-measurement-based attitude determination techniques, requiring simultaneous tracking of at feast two satellites, the system and method employing the roll filter based processor described herein needs to track only one satellite for providing the roll rate and roll angle information. However, the present invention is able to accept phase and/or amplitude difference measurements from additional satellites, if available, for improved accuracy.

SUMMARY OF THE INVENTION

The present invention provides a low cost means of measuring the roll rate and roll angle of spinning platforms in a jamming environment. Although designed to provide accurate measurements in the presence of jamming, the present invention also provides reliable measurements during periods when jamming is absent. Two or more antennas are installed on the platform, and their output signals processed through the usual RF front end of a GPS receiver. The signals received from the RF front end consist of the following: thermal noise; signals received from the satellite; and any interference signals received from the jammers. The interference signals are suppressed by self-adaptive beam-forming bulling, and the clean satellite signals rendered for further processing to determine roll rate and roll angle.

For suppressing the jammer signals, a correlation matrix is formed with the data sampled on the multiple antenna channels. The antijam algorithm is based on the Sample Matrix Inversion (SMI) technique (See, e.g., I. S. Reed, J. D. Mallett, L. E. Brennan, "Rapid Convergence Rate in Adaptive Arrays," IEEE Transactions on Aerospace and Electronic Systems, Vol. AES-10, No. 6, 1974), where the antijam weights are computed by multiplying the inverse of the correlation matrix with a suitable steering vector. These antijam weights are then applied to the (delayed) sampled data that were previously used to generate the weights. The sampled data are temporarily stored in a first-in-first-out (FIFO) memory to account for the delay associated with forming the covariance matrix and computing the antijam weights.

The resulting filtered GPS signals from the antenna channels, in which the interferences from the jammers have been suppressed, serve two purposes. One permits the standard function of a GPS receiver: to track the frequency or phase of the carrier and the phase of the transmitted code for indications of pseudorange and Doppler. Similar measurements from multiple satellites help determine the instantaneous position and velocity of the vehicle. The signals received by the antennas are combined for this purpose so as to retain visibility of the satellites at all roll angles.

The other purpose for which the filtered channel signals are used is indicating the differences in phase and/or amplitude between the GPS satellite signals received on selected pairs of antennas. This second function enables the measurement of platform roll rate and roll angle. The differences in carrier phase and signal amplitude between the signals received from the same satellite on two discrete antennas, which are typically (but not necessarily always) mounted on the platform circumferentially about its spin axis and pointed in different directions, are related to the difference in path lengths from the satellite to those two antennas; that path length difference is related to the attitude of the platform to which the antennas are fixedly attached at the specified separation distance, i.e. baseline. For these measurements, each antenna channel signal is input to a separate correlator, where each such correlator is slaved to the correlator in the navigation channel discussed above. The above determinations may be aided using navigation or attitude data from non-GPS measurement sources where available.

The channel signal correlators are driven synchronously, so that the correct phase difference is indicated between the channel signals even if phase tracking is not achieved in the GPS receiver. This is a distinction from most prior techniques, which typically measure the carrier phases of different channel signals using different independent GPS receivers. These prior art measurements provide meaningful data only if all the independent GPS receivers track carrier phase. The present invention only requires tracking of the carrier frequency, but can work with carrier phase tracking as well. At the very high roll rates of interest to the present invention, the receiver rarely achieves phase tracking due to high platform dynamics, short mission time, and intentional or unintentional interference.

Where no jamming is present, the correlation matrix and its inverse are identity matrices and antijam filtering is not required. In that case, the channel signals can be provided directly to the correlators, whose outputs are measured for phase and amplitude differences that serve as inputs to a roll filter, such as a Kalman filter or an Extended Kalman Filter (EKF), for calculating roll. Due to the properties of the correlation matrix and its inverse in the absence of jamming, the system with jamming protection reduces to the equivalent of an architecture without jamming protection if none is needed. However, if one wishes to bypass the antijam section under those conditions, the absence of jamming can be indicated by a jammer detector, such as one that verifies whether the measured carrier-to-noise ratio is within the normal range for system thermal noise.

An object of the present invention is to provide a GPS signal-based measurement of the roll rate and roll angle of a platform in a jamming environment and when jamming is absent, using a single augmented GPS receiver.

A second object of the present invention is to provide a GPS signal-based measurement of the roll rate and roll angle of a platform in a jamming environment and when jamming is absent where the baseline between the antennas is a fraction of the GPS signal wavelength.

A third object of the present invention is to provide a GPS signal-based measurement of the roll rate and roll angle of a platform in a jamming environment and when jamming is absent, using multiple antennas arrayed circumferentially on the platform about its spin axis and at or near the same spin axis location.

A fourth object of the present invention is to provide GPS signal-based measurements of the roll rate and roll angle of a platform rotating at high rates in a jamming environment and when jamming is absent.

Another object of the present invention is to provide a GPS signal-based measurement of the roll rate and roll angle of a platform in a jamming environment and when jamming is absent without the aid of inertial instruments.

Still another object of the present invention is to provide a GPS signal-based measurement of the roll rate and roll angle of a platform in a jamming environment and when jamming is absent by using a filter, such as a Kalman filter or an Extended Kalman Filter (EKF), which includes a model of the vehicle's roll dynamics. The term "Extended Kalman Filter" is commonly understood to mean a dynamic filter of Kalman form, which is a linear operator, extended to apply to a nonlinear problem. In the present context, the linear form of the Kalman filter is extended to accept carrier phase difference and/or amplitude difference measurements that are nonlinearly related to the platform roll angle.

Yet another object of the present invention is to provide a GPS signal-based measurement of the roll rate and roll angle of a platform in a jamming environment and when jamming is absent with the roll rate and roll angle estimator formulated as an EKF, having as inputs the measured carrier phase and/or amplitude differences between the filtered GPS satellite signals received at the different antennas.

A further object of the present invention is to provide a GPS signal-based measurement of the roll rate and roll angle of a platform in a jamming environment and when jamming is absent that allows for the introduction of navigation or attitude data from a non-GPS measurement source, such as from an inertial sensor, magnetometer, star tracker, sun sensor, or earth sensor, for improved performance.

These and related objects of the invention are achieved in the preferred embodiment of the present invention described using the drawings herein. The drawings are primarily for illustration and must not be construed as limiting. The scope of the invention is to be limited only by the claims, and not by the drawings or description herein.

BRIEF DESCRIPTION OF THE DRAWINGS

The objects, features, and advantages of the present invention are more fully understood when considered in conjunction with the following accompanying drawings.

DETAILED DESCRIPTION OF THE INVENTION

Figure 1:
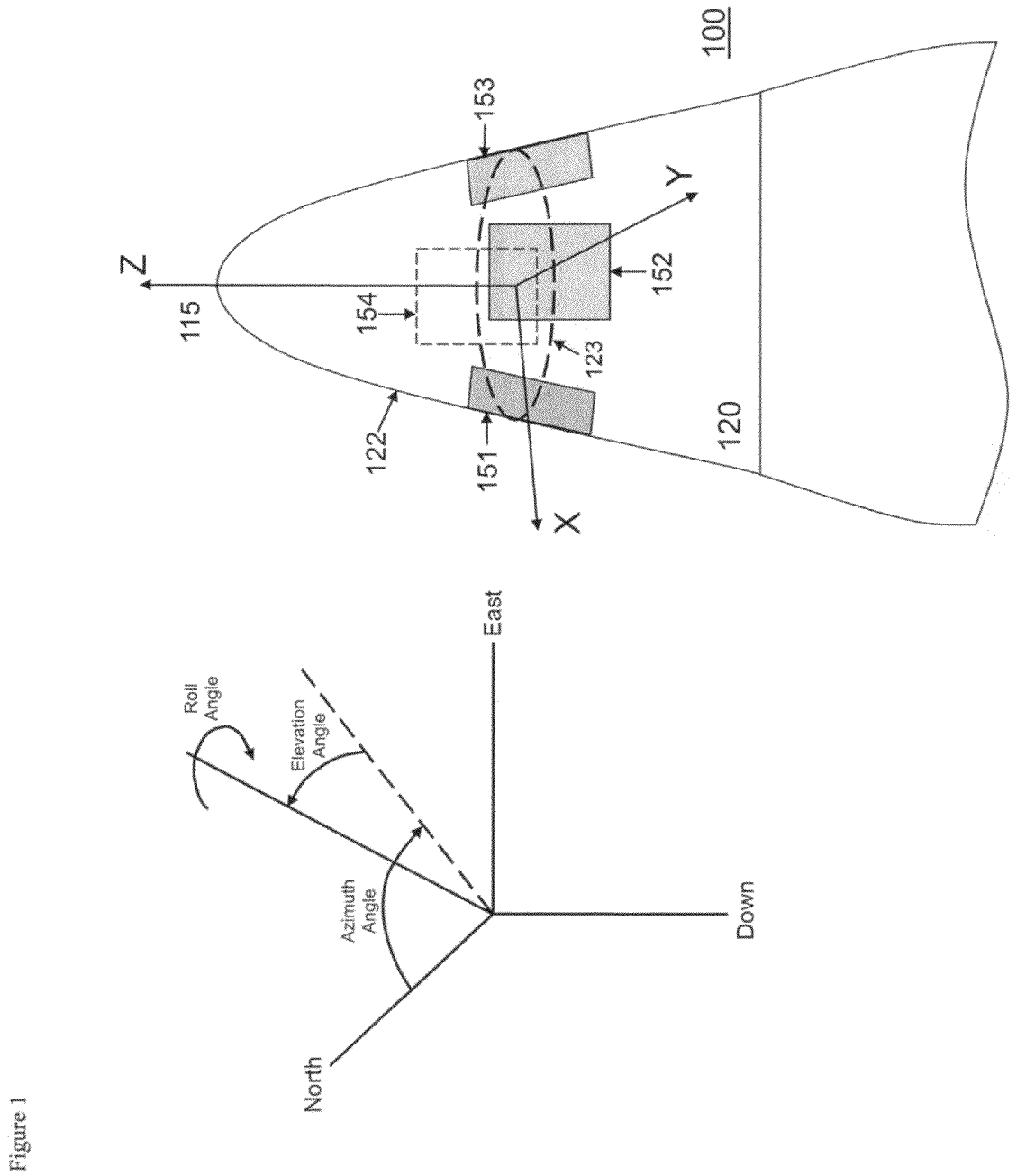
FIG. 1 shows the front end body of a notional projectile with four antennas disposed about the circumference.

FIG. 1 shows the front end body 120 of a notional projectile 100, with its four-antenna array comprising the antennas 151, 152, 153, 154 attached to the body 120 of the projectile 100. The antennas 151, 152, 153, 154 in FIG. 1 are pointed in different directions. Although this diagram is based on a four-antenna system, an antenna array comprising any multiplicity of antennas, two or greater, can be used. For a platform in the typical projectile configuration 100 shown in FIG. 1, these antennas are preferably disposed about the circumference 122 of the body 120 at a selected location 123 of its spin axis 115. For small platforms, the spacing between the antennas can be small fractions of the GPS signal wavelength. The orientation of the projectile 100 may be defined by a set of three Euler angles: Azimuth, Elevation and Roll (FIG. 1).

Figure 2:
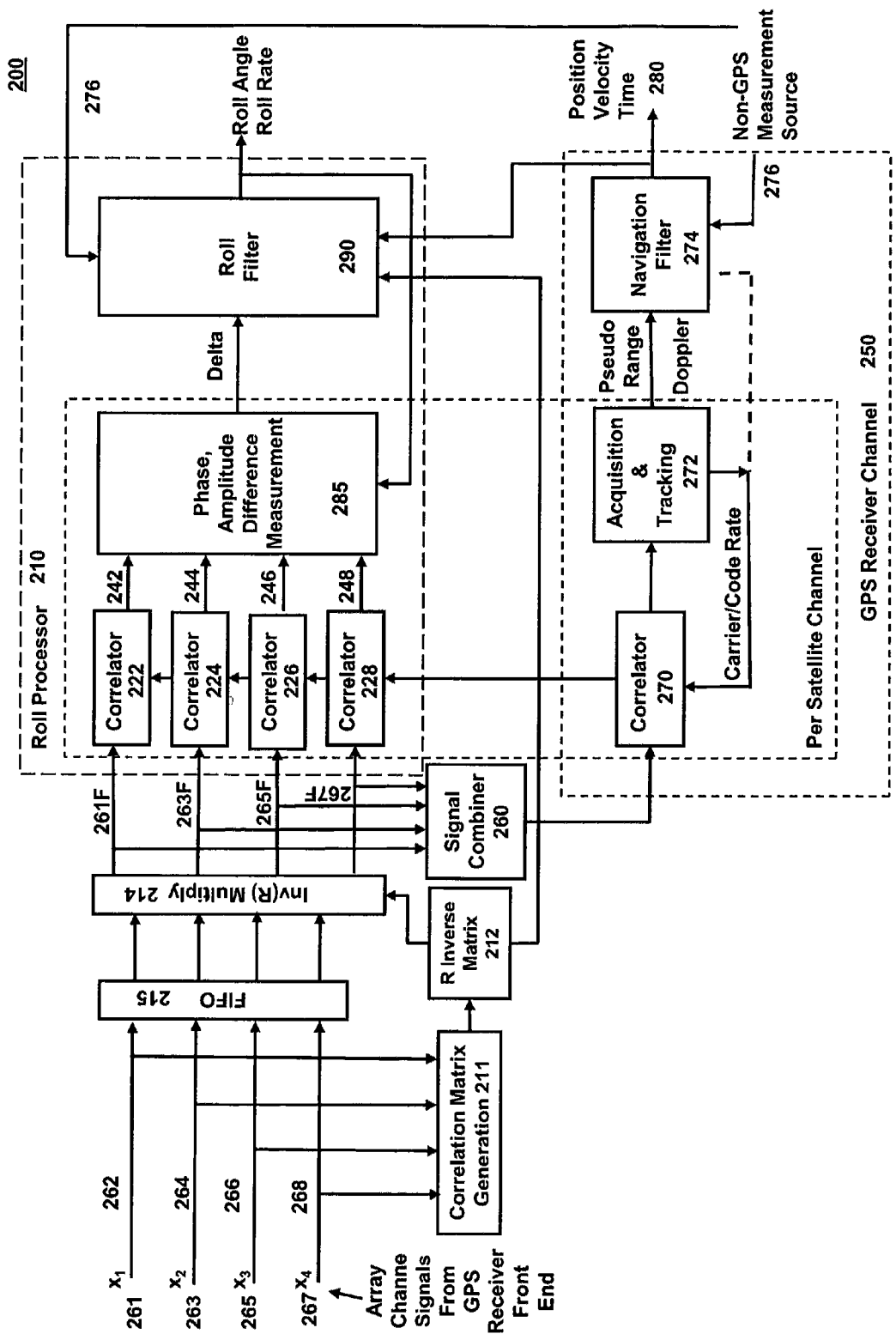
FIG. 2 represents the GPS receiver architecture of the preferred embodiment with consideration of jamming.

The preferred GPS receiver architecture 200 for a four-antenna array of the present invention is shown in FIG. 2. Bandwidth-limiting filtering (not shown) is first applied to the four received antenna signals to attenuate thermal noise and interference signals from the jammers. Also not shown is the additional front end processing to achieve the purposes of the instant invention, which are (a) performing the standard function of a GPS receiver, and (b) indicating the differences in phase and amplitude between the satellite signals received on selected pairs of antennas for the measurement of platform roll rate and roll angle.

The incoming radio-frequency (RF) signals from the four antennas (containing GPS signals, thermal noises, and jammer interference signals) are filtered, amplified, and down-converted to intermediate-frequency (IF) signals. The IF signals are then sampled and digitized by analog-to-digital converters (ADC). The discrete sampled data are further down-converted to a base-band frequency by the digital down converters (DDC) to produce the antenna array channel signals (261,263,265,267). The phase and amplitude variations among the four channel signals due to delays and gain variations in the RF channels are calibrated and compensated at this point.

A correlation matrix, R, 211 is formed using data sampled from the multiple antenna channels. The antijam algorithm is based on the Sample Matrix Inversion (SMI) technique, in which the antijam weights are computed by calculating $\hat{R}^{-1}$ 212, the inverse of the correlation matrix R 211, and multiplying it with a suitable steering vector. The block labeled Inverse R Multiply 214 multiplies the four channel signals of its input data, viewed as a vector, by the inverse of the correlation matrix measured from the same input data. The data that are processed in this manner have been stored temporarily in a first-in-first-out (FIFO) memory 215, which adjusts for the time required to measure the correlation matrix, invert it, and complete the calculation of the antijam weights—thus applying the weights to the same interval of data as were used to calculate them. The resulting signals, 261F, 263F etc., are input to the correlators 222, 224 etc. for further processing to determine roll rate and roll angle.

These same signals, viz. 261F, 263F etc., are also provided to the Signal Combiner 260, where they are summed for use in the GPS receiver navigation channel. Combining these signals as a weighted sum is represented analytically as multiplication by a steering vector. For a spinning projectile, one often chooses the omnidirectional steering vector [1 1 1 1] to help assure upward visibility at all roll angles. This process produces a single channel of data which includes the satellite signal at all roll angles. At the cost of increased computational complexity one can form at this point a signal with the jamming suppressed optimally according to the SMI criterion of maximum signal-to-interference plus noise ratio. This requires combining the signals 261F through 267F with a steering vector that "points" to the satellite. The elements of this vector depend on vehicle orientation, and to be effective must be recomputed often enough to substantially keep up with the vehicle roll angle.

Besides the optimum suppression of jamming interference achieved in the combined signal, the interference from jamming is also largely suppressed for each of the channel signals 261F through 267F. These four data streams of clean filtered GPS signals are used for roll processing. Where no jamming is present, the correlation matrix 211 and its inverse 212 are identity matrices and antijam filtering is not required. In that case, the channel signals 261, 263, 265, 267 can be provided directly to the correlators, e.g. 222, 224, whose outputs, e.g. 242, 244, are measured for phase and amplitude differences that serve as inputs to the roll filter 290. Due to the properties of the correlation matrix and its inverse in the absence of jamming, the system with jamming protection as shown in FIG. 2 reduces to the equivalent of an architecture without jamming protection if none is needed. However, if one wishes to bypass the antijam section under those conditions, the absence of jamming can be indicated by a jammer detector, such as one that verifies whether the measured carrier-to-noise ratio is within the normal range for system thermal noise.

The standard GPS navigation function is implemented using a GPS receiver in the lower track 250. The four data streams of filtered GPS signals, 261F, 263F, 265F, 267F are first combined into one in the block 260 labeled "Signal Combiner." This is often taken as a unit-gain summer which assures that the satellites are visible at all roll angles in at least one of the antenna array channels, e.g. 262, 264, 266, 268. Other choices may well occur to those familiar with the art—such as use of weights that depend on the indicated roll angle in such a way as to emphasize the channels that are currently facing upward while de-emphasizing the others. All such variations on the preferred embodiment described herein are within the scope of the present invention.

The usual navigation operations then follow, including carrier and code correlation 270, acquisition as well as frequency and code tracking 272, and filtering 274 of the pseudorange and Doppler measurements to produce the navigation solution 280 describing the projectile's position and velocity. For optionally updating the GPS navigation solution 280, the filter 274 may be aided using navigation data 276, if available, from a non-GPS measurement source, such as an inertial measurement unit (IMU), magnetometer, altimeter, or a reference vehicle trajectory computed from the known parameters of the projectile aerodynamics and meteorological data.

The roll measurement function is implemented in the upper track 210, which is labeled in its entirety as the "Roll Processor". Each of the filtered GPS signals 261F, 263F, 265F, 267F, is correlated separately in 222, 224, 226, 228, respectively, with the correlator carrier and code driven synchronously by the GPS receiver at the same frequency that is tracked by the receiver channel in its tracking filter 272 or navigation filter 274 and used to drive its correlator 270. This assures that the GPS signals in each of the channels 262, 264 etc. maintain the same phase relationships among themselves, both pre- and post-correlation.

These phases are advancing at some indeterminate frequency which makes them difficult to interpret. But the phase differences between any two signals are slowly varying functions of the relative phases of the satellite signal, as received on the different antennas, e.g. 152, 154 etc., and the relative phase shifts introduced by the receiver electronics within the respective channels (which are calibrated and compensated out or otherwise accounted for in phase difference processing). The relative phases of the GPS signals depend on the relative times of arrival of the satellite signal at the respective antennas, e.g. 152, 154 etc., and any phase shifts through those antennas.

Figure 3:
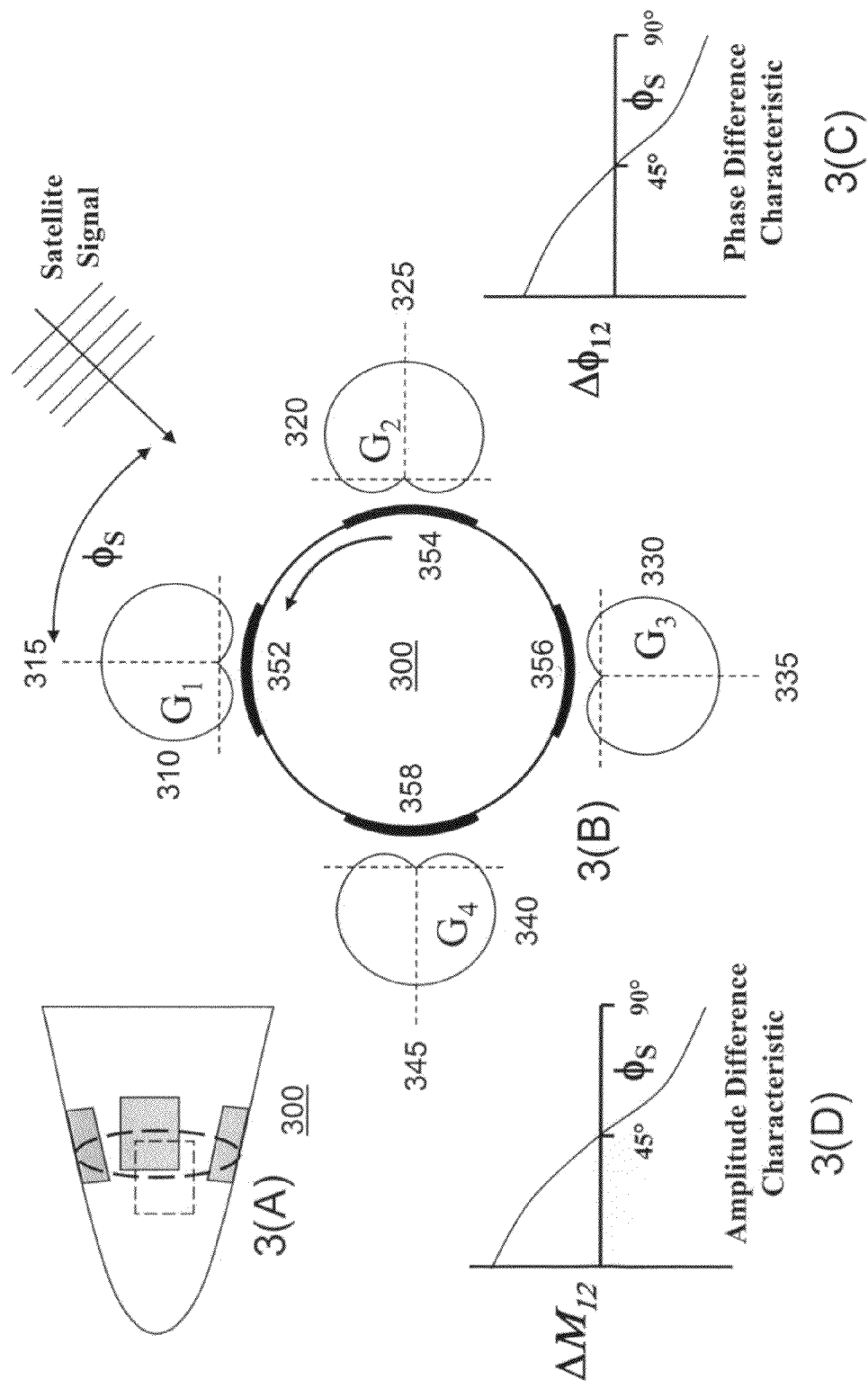
FIG. 3 depicts the geometry, receiving patterns, and phase and amplitude difference characteristics of four antennas located at 90 degrees from each other around the circumference of the notional projectile.

The measured phases are functions of the geometry of the antenna's Line of Sight (LOS) to the satellite, the locations of the antennas, e.g. 352, 354, 356, 358 in FIG. 3, and the beam patterns of those antennas, e.g. 310, 320, 330, 340, at the angles at which the satellite signal is received. Similarly, the measured amplitude differences depend on the geometrical relationship between the LOS to the satellite, the locations of the antennas and the beam patterns of those antennas at the angles at which the satellite signal is received.

Although the phase difference processing approach is emphasized in the following to keep the discussion simple, much of what is discussed applies equally to amplitude difference processing. FIG. 3A shows a four-antenna array disposed circumferentially on the front end of the vehicle. Given the attitude of the vehicle, the locations of the antennas on the vehicle, and the antenna receiving patterns, the difference in phase (or amplitude) between any two correlated signals, e.g. 242, 244, 246, and 248, can be computed 285. The phase (or amplitude) differences computed for the signals from different pairs of the antennas provide information about the projectile's roll angle. The phase and amplitude differences can be indicated in various ways familiar to those skilled in the art. As an example, and not to limit the scope of this invention, the phase difference may be determined using the relation $\Delta \phi = \tan^{-1}(a \times b^*)$ where a and b are accumulations from the outputs of the correlators in the channels being processed.

If the four antenna gain patterns 310, 320, 330, 340 shown in FIG. 3(B) are symmetric about their boresight lines e.g. 315, 325, 335, 345, a satellite signal arriving from the direction midway between the directions of the boresight lines e.g. 315, 325 of the two antennas, e.g. 352, 354 facing the satellite, will be received on those antennas with equal phase and amplitude. If the projectile roll angle is varied within some range about that initial value, the phase of the signal in one channel, e.g. 262, will increase and that in the other channel, e.g. 264, will decrease. Similarly, the amplitude of the signal in one channel will increase and that in the other will decrease. This will result in the phase difference and amplitude difference variations between them as shown in FIGS. 3(C) and 3(D) respectively. For the range shown, the phase difference between the signals in the receiving Channels corresponding to the antennas 352 and 354 provides a useful measurement for roll angle estimation. As the projectile rolls further in the positive direction (i.e. counter-clockwise, as viewed in the figure) the satellite LOS departs from the useful region for antenna 352 and enters the useful region for antenna 356. Then the phase difference of the signals in the channels corresponding to antennas 354 and 356 provides the useful measurement to process in the EKF for roll estimation.

The receiving pattern characteristics of the antennas, e.g. 352, 354 etc., on the projectile, e.g. 300, determine the strength and phase rotation of the received signals. Since roll estimation depends on the strength and phase relationships between the received signals, the number of antennas, antenna array configuration, and antenna gain patterns strongly influence roll estimation performance. The details of the relationship between the difference in phase measured for the signals from each of the antenna channel pairs and the vehicle roll angle is described in sufficient detail in the commonly owned co-pending patent application ("GPS-Based Measurements of Roll Rate and Roll Angle of Spinning Platforms," Ser. No. 12/008,141).

The Roll filter 290 for estimating roll rate and roll angle based on measurements of phase (and amplitude) differences between adjacent channel signals is preferably an Extended Kalman Filter (EKF). It will be obvious to the person skilled in the art that this Roll filter function can be performed as well by filters of other forms including fixed-gain filters. For example, it is possible to modify the foregoing formulation to use a linear Kalman filter rather than an extended form of that filter. This can be achieved by inverting the nonlinear relation between roll angle and phase difference to infer a roll angle corresponding to each measured phase difference, and then applying the derived roll measurement as an input to a linear Kalman filter. All such other filter formulations obvious to those skilled in the art are within the scope of the present invention.

Table 1 displays the discrete time extended Kalman filter vector measurement formulation for the roll rate and roll angle indication of a spinning platform using the phase difference approach. The filter 290 operates by cycling between Time Propagation and Measurement Update steps. The filter state vector x contains the roll angle $\phi_R$ (in cycles) and roll rate $\dot{\phi}_R$ (in Hz) as state variables. The filter Time Propagation is based on the following model for the filter state dynamics:

$$\frac{d}{dt}\phi_R = \dot{\phi}_R$$

$$\frac{d}{dt}\dot{\phi}_R = -\frac{1}{\tau}\dot{\phi}_R + a_c + n(t)$$

where $$\frac{1}{\tau}\dot{\phi}_R$$

represents roll damping, $a_c$ represents roll acceleration due to control action, and n(t) represents white noise in roll acceleration.

The rate of change of roll rate includes a roll damping term which is negligibly small in many cases, and a control action roll acceleration term which is provided by the platform control system. If the control system issues a command which affects the roll rate, this roll acceleration term assists the Roll filter 290 by anticipating the change. The uncertainty in our representation of roll acceleration is represented in the above model as a white noise process. This white noise representation prevents the filter gain from converging to zero and losing the ability to track a changing roll rate. Inclusion of the roll acceleration as a filter state variable can further enhance the ability to track a changing roll rate. The second order model of roll dynamics given here is illustrative only and is not meant to limit the scope of this invention. Any order of model can be used, according to the nature of the application, and all are within the scope of the present invention.

The meanings of the parameters in the equations in Table 1 are as follows: $\Phi$ is the state transition matrix relating state vector $\hat{x}_k^+$ at time step k after measurement update to state vector $\hat{x}_{k+1}^-$ at time step k+1 before measurement update;

N is the power density of white noise n(t). It is used as a design parameter to tune the filter operation to the expected level of roll dynamic activity;

T is the time between filter updates;

$\hat{x}^-$ and $P^-$ are the state estimate vector and error covariance matrix at the present time, prior to incorporating the present measurement. They result from the preceding Time Propagation step;

$\hat{x}^+$ and $P^+$ are the state estimate vector and error covariance matrix at the present time after incorporating the present measurement. They are the initial conditions for the next Time Propagation step;

$\underline{H}$ is the linearized measurement sensitivity matrix $$\left(\frac{\partial \underline{m}}{\partial \underline{x}}\right).$$

It is a function of x
and is evaluated at $\hat{x}^-$;
K is the Kalman gain matrix;
$\underline{\underline{R}}$ is the measurement noise covariance matrix;
$\tilde{m}$ is the actual measurement;
$\phi_i$ is the phase of the signal in channel i. (As discussed earlier, the amplitude of the signal in channel i can also be likewise processed as a measurement—and the preferred approach is to use both phase and amplitude differences together for maximum benefit);
$m(\hat{x}^-)$ is the predicted measurement function based on the prior estimate of x; and
$\underline{I}$ is the identity matrix.

The vector form of measurement update is used if all the available phase difference measurements, $\Delta\phi_{ji}=\phi_j-\phi_i$, are processed in one step. Similarly, the amplitude difference measurements, $\Delta A_{ji}=A_j-A_i$, are also processed in one step when using the amplitude processing method. In view of the fact that the number of these measurements available will change from time to time, and thus the dimensions of m, H, K, and $\underline{\underline{R}}$ will change, it is convenient to process the available measurements one at a time, and repeat the update process as many times as the phase and amplitude difference measurements are made.

Table 2 shows the discrete time Extended Kalman Filter scalar measurement formulation for the phase difference approach, which provides the flexibility of using any number of available measurements. The number of measurements to be processed depends on the number of satellites used for roll processing.

The parameters used in this scalar formulation for phase difference processing are as follows:

$$\underline{h} = \begin{bmatrix} \frac{\partial \Delta\phi_{ji}}{\partial \phi_R} \\ 0 \end{bmatrix} = \begin{bmatrix} \frac{\Delta\phi_{ji}(\hat{\phi}_R^- + \delta\phi_R) - \Delta\phi_{ji}(\hat{\phi}_R^- - \delta\phi_R)}{2\delta\phi_R} \\ 0 \end{bmatrix}$$

is the linearized measurement sensitivity vector;
k is the Kalman gain vector; and
r is the measurement noise variance (a scalar).

TABLE 1

Extended Kalman filter vector measurement formulation for roll rate and roll angle indication of spinning platforms.

| Time Propagate | Filter State |
|---|---|
| $\hat{\underline{x}}_{k+1}^- = \underline{\underline{\Phi}} \cdot \hat{\underline{x}}_k^+$ | $x = \begin{bmatrix} \phi_R \\ \dot{\phi}_R \end{bmatrix}$ |
| $\underline{\underline{P}}_{k+1}^- = \underline{\underline{\Phi}} \cdot \underline{\underline{P}}_k^+ \cdot \underline{\underline{\Phi}}^T + \begin{bmatrix} \frac{1}{3}NT^3 & \frac{1}{2}NT^2 \\ \frac{1}{2}NT^2 & NT \end{bmatrix}$ | |
| $\underline{\underline{\Phi}} = \begin{bmatrix} 1 & T \\ 0 & 1 \end{bmatrix}$ | |

| Measurement Update | Measurements |
|---|---|

TABLE 1-continued

Extended Kalman filter vector measurement formulation for roll rate and roll angle indication of spinning platforms.

$\underline{\underline{K}} = \underline{\underline{P}}^- \underline{\underline{H}}^T (\underline{\underline{H}} \underline{\underline{P}}^- \underline{\underline{H}}^T + \underline{\underline{R}})^{-1}$
$\hat{\underline{x}}^+ = \hat{\underline{x}}^- + \underline{\underline{K}} \cdot [\tilde{m} - m(\hat{\underline{x}}^-)]$
$\underline{\underline{P}}^+ = (\underline{\underline{I}} - \underline{\underline{K}}\underline{\underline{H}}) \cdot \underline{\underline{P}}^-$ $\tilde{m} = \begin{bmatrix} \phi_1 - \phi_2 \\ \phi_2 - \phi_3 \\ \phi_3 - \phi_4 \\ \phi_4 - \phi_1 \end{bmatrix}$ $\underline{\underline{H}} = \frac{\partial \underline{m}}{\partial \underline{x}}$ $\underline{\underline{R}} = [\phi_{Ni,i+1}\phi_{Nj,j+1}]$

TABLE 2

Extended Kalman filter scalar measurement formulation for roll rate and roll angle indication of spinning platforms.

| Time Propagate | Filter State |
|---|---|
| $\hat{\underline{x}}_{k+1}^- = \underline{\underline{\Phi}} \cdot \hat{\underline{x}}_k^+$ | $x = \begin{bmatrix} \phi_R \\ \dot{\phi}_R \end{bmatrix}$ |
| $\underline{\underline{P}}_{k+1}^- = \underline{\underline{\Phi}} \cdot \underline{\underline{P}}_k^+ \cdot \underline{\underline{\Phi}}^T + \begin{bmatrix} \frac{1}{3}NT^3 & \frac{1}{2}NT^2 \\ \frac{1}{2}NT^2 & NT \end{bmatrix}$ | |
| $\underline{\underline{\Phi}} = \begin{bmatrix} 1 & T \\ 0 & 1 \end{bmatrix}$ | |

| Measurement Update | Measurements |
|---|---|
| $\underline{f} = \underline{\underline{P}}^- \cdot \underline{h}$ | $\tilde{m} = \Delta\phi_{ji} = \phi_j - \phi_i$ |
| $\underline{k} = \frac{1}{\underline{h}^T \cdot \underline{f} + r} \cdot \underline{f}$ | $r = \frac{scaling\_factor}{\sqrt{|Mag_i| \cdot |Mag_j|}}$ |
| $\hat{\underline{x}}^+ = \hat{\underline{x}}^- + \underline{k} \cdot [\tilde{m} - m(\hat{\underline{x}}^-)]$ | |
| $\underline{\underline{P}}^+ = \underline{\underline{P}}^- - \underline{k} \cdot \underline{f}^T$ | |

For the discrete time Extended Kalman Filter using the amplitude difference method, the following changes are required in Table 2:
1). The amplitude difference measurements are substituted for phase difference measurements;
2). The Jacobian h is represented as:

$$\underline{h} = \begin{bmatrix} \frac{\partial \Delta A_{ji}}{\partial \phi_R} \\ 0 \end{bmatrix} = \begin{bmatrix} \frac{\Delta A_{ji}(\hat{\phi}_R^- + \delta\phi_R) - \Delta A_{ji}(\hat{\phi}_R^- - \delta\phi_R)}{2\delta\phi_R} \\ 0 \end{bmatrix},$$

where A is the amplitude; and
3). The measurement noise r is assumed to be constant.

In the absence of any additional contribution, the measurement function represents the phase shift due to the antenna and any calibrated but uncompensated phase shift through the channel electronics. Here, however, since the channel data are multiplied by the inverse correlation matrix prior to their correlation with the satellite code, the phase angles of the output channel signals are shifted further. This additional phase is inherent in the measured signals, $\tilde{m}$, and therefore must be included in the prediction of those signals based on the current estimate of the filter state, $m(\hat{x}^-)$.

The parameter r was defined above as the variance of the noise on the measurement being processed. Here, the interpretation of r is generalized to indicate the degree to which each measurement is emphasized. It was previously shown with respect to FIG. 3 how the utility of each phase difference measurement increases and decreases over the cycle of platform roll. The filter formulation in Table 2 recognizes this by modulating a fixed scaling factor inversely with the geometric mean of the magnitudes of the antenna gain patterns, e.g. 310, 320 etc., of the two channels participating in each measurement. This results in a larger filter gain for the measurement being processed, based on the antenna elements, e.g. 352, 354 etc., most nearly facing the satellite. In addition, the sensitivity of phase difference to platform roll angle decreases with the out-of-roll-plane angle of the line of sight ("LOS") to the satellite. (The roll plane represents the plane normal to the platform's roll axis.) This effect also is recognized by adjusting the filter parameter r. In effect, the measurement noise-to-signal ratio increases as the LOS approaches the platform longitudinal axis—and the value of r is increased to reflect this.

Under jamming conditions, since the magnitudes in Table 2 read from the antenna patterns are modified by the $\hat{R}^{-1}$ multiplication (FIG. 2) and since $\hat{R}^{-1}$ changes over every sampling period, the filter parameter r is computed in real time for the phase difference approach as follows:

$$r = \frac{\text{scaling\_factor}}{\sqrt{\sqrt{(\hat{I}_i^2 + \hat{Q}_i^2)} \cdot \sqrt{(\hat{I}_j^2 + \hat{Q}_j^2)}}}$$

where I and Q represent, respectively, the $\hat{R}^{-1}$ modified in-phase signal and quadrature-phase signal measured inputs to the Roll filter. Consequently, $\hat{R}^{-1}$ is also input into the Roll filter for calculating the predicted I and Q values that take into account the $\hat{R}^{-1}$ multiplication, and against which, therefore, the $\hat{R}^{-1}$ modified measured values can be compared.

For GPS attitude determination in the presence of jamming, deciding on how to combine the received multiple antenna channel measurements for updating the Roll Filter state estimates is crucial. One approach to this choice, referred to as the "Strongest-Neighbor Filter" (SNF), processes the single measurement with the lowest value of the parameter r defined above, since the gain with which the filter incorporates a measurement depends inversely upon r. A natural choice of selection rule is:

$$\max_{i,j}(\hat{I}_i^2 + \hat{Q}_i^2) \cdot (\hat{I}_j^2 + \hat{Q}_j^2)$$

that is, the pair selected has the maximum power product of predicted IQ data. This heuristic rule works well for no jamming and low level of jamming since the higher the power product of the predicted IQ, the less noise there is in the phase difference measurement.

While this and other techniques are possible, the preferred approach is to process all of the measurements by individually assigning them different weights. A preferred technique for assigning the weights is probabilistic data association (PDA). See, e.g., Thiagalingam Kirubabajan, Yaakov Bar-shalom, "Probabilistic Data Association Techniques for Target Tracking in Clutter," Proceedings of the IEEE, Vol. 92, No. 3, March 2004.

The PDA algorithm used herein calculates in real-time the probability that each measurement is valid, based on the estimated value of the current roll angle provided by the Roll filter. This formulation is referred to as the PDA Filter (PDAF). The filter state and covariance matrix update is computed for each of the measurements using different antenna element pairs. This set of measurements can optionally include phase differences and/or amplitude differences for various pairs of antenna channels. As stated previously, the inclusion of both phase difference and amplitude difference measurements is preferred. The results are combined using weights representing the probabilities that the measurements are valid.

In the absence of jamming, for a projectile spin rate of 300 Hz, experimental and simulation results demonstrate that processing signals from one satellite is sufficient to obtain stable and satisfactory roll rate and roll angle estimates. However, under severe jamming (e.g., jammer located close to the satellite), it is desirable that the PDAF processes signals from multiple satellites. The expectation is that one can find a satellite far removed from the jammer to allow the PDAF to converge faster and provide better estimates. The computational cost of processing signals from multiple satellites is that the PDAF has to process many more measurements for each update.

Figure 4:
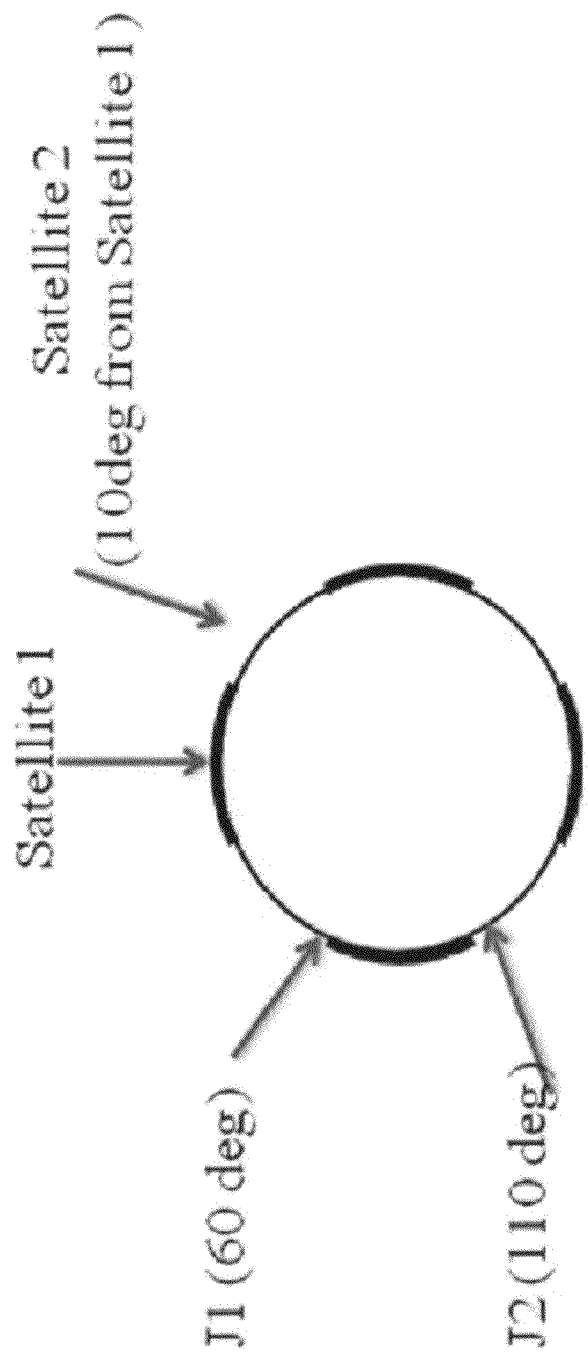
FIG. 4 presents an example geometry in which proper weighting of the measurements from two satellites greatly improves roll indication performance.

FIG. 4 shows an example scenario using the phase difference method for demonstrating that processing the signals from multiple satellites improves the PDAF performance. Here, Satellite 1 is closer than Satellite 2 to the two 40 dB jamming-to-noise ratio (J/N) Jammers, J1 and J2, which are displaced by 60 degrees and 110 degrees, respectively, away from Satellite 1. Simulation shows that the PDAF output based only on the Satellite 1 measurement is unstable, with the state estimates diverging occasionally. Since Satellite 2 is located farther from the Jammers, being further displaced from Satellite 1 (and, therefore, also the jammers) by an additional 10 degrees, the PDAF preferentially places more weight on the measurements from Satellite 2, compared with those from Satellite 1, and thereby achieves improved filter performance.

Figure 5:
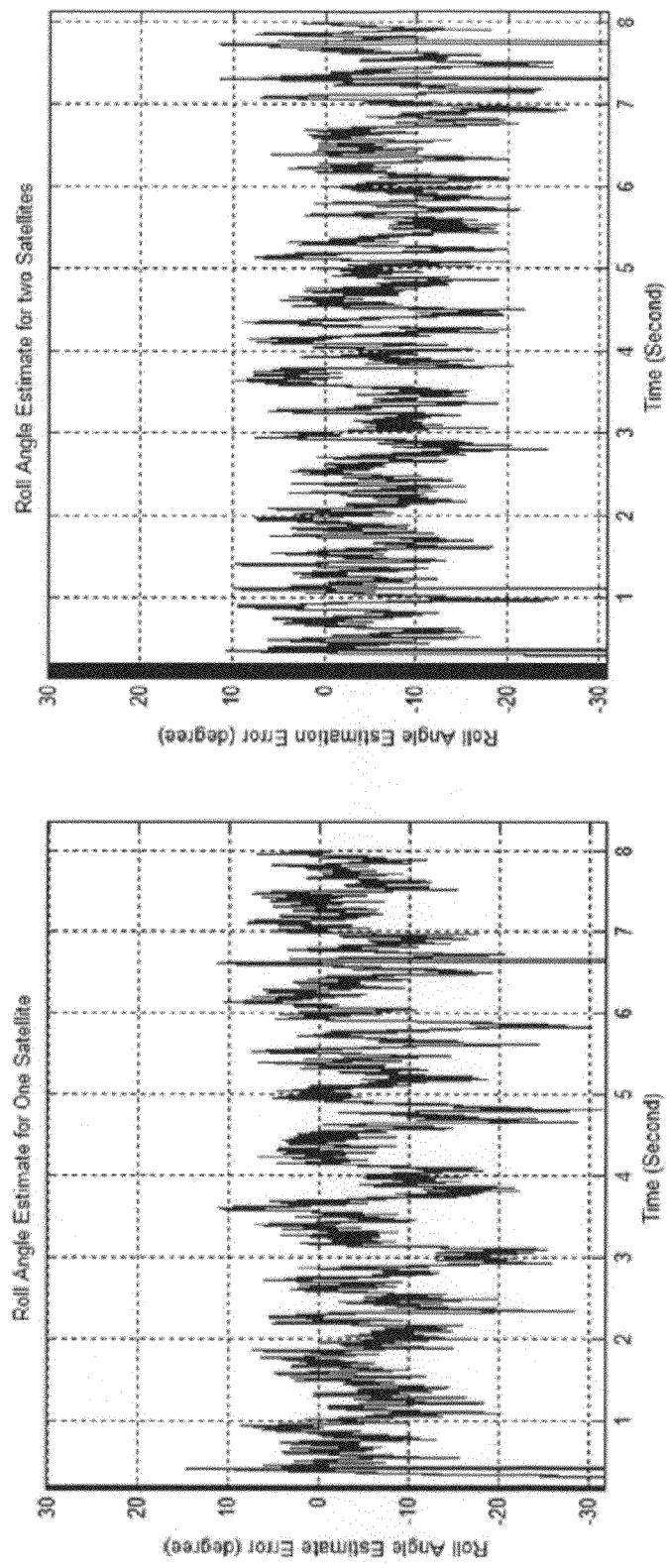
FIG. 5 shows the plots of roll angle estimation errors obtained when processing signals from one and two satellites.

In simulation runs, the PDAF with 2 satellites converged twice as fast compared with one satellite. Also, all of the simulations (50 Monte-Carlo runs) for the two-satellite case converged, while only 30 out of 50 runs converged when processing the signals from just one satellite. The errors in the estimates of the roll rate and roll angle were also reduced for the two satellite case. FIG. 5 shows the plots of roll angle estimation errors obtained when processing signals from one and two satellites. The roll angle estimate with two satellites provides better accuracy than that obtained with one satellite. The performance improvements obtained with processing the signals from multiple satellites benefits all three approaches, namely those using phase differences, amplitude differences, or both phase and amplitude differences.

Figure 6:
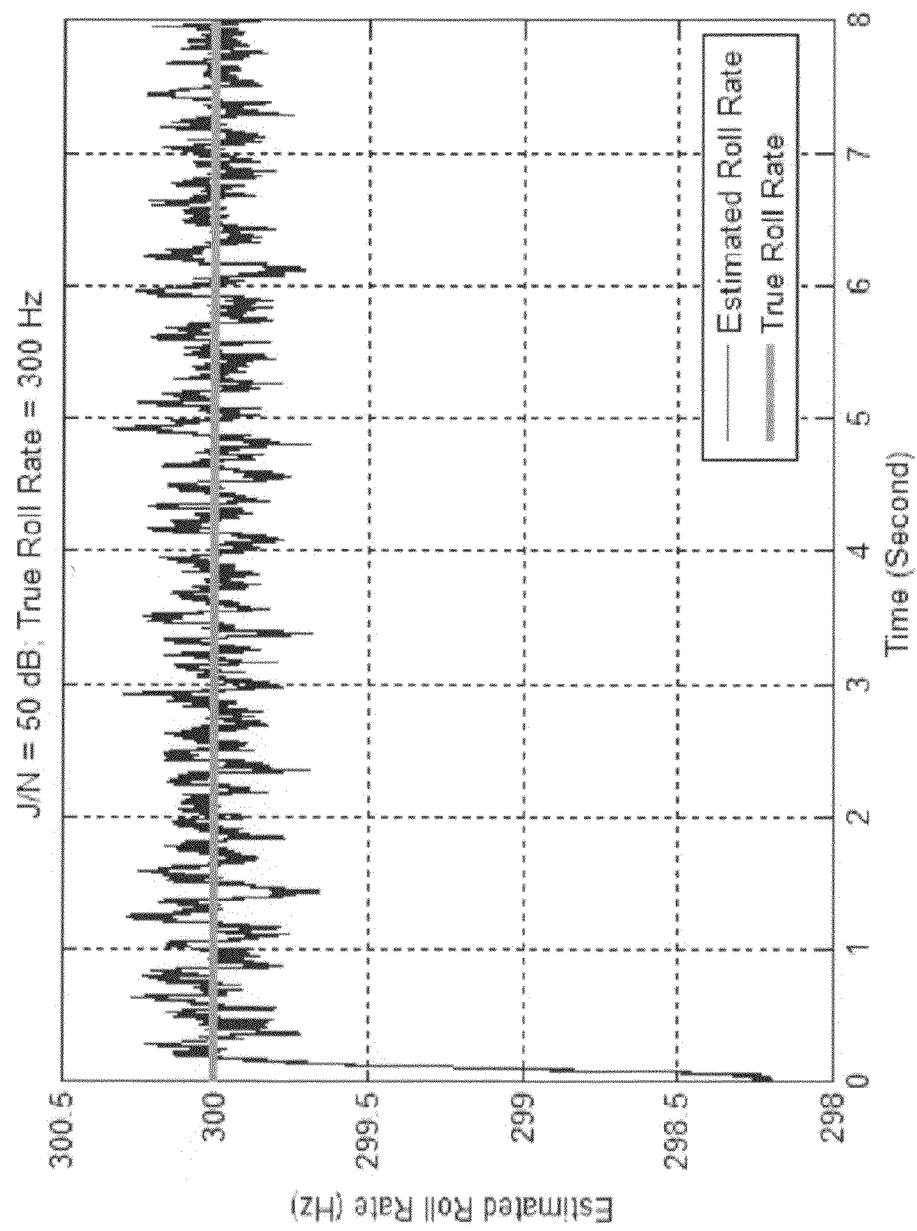
FIG. 6 displays simulation results of estimated roll rate in the presence of a broadband jammer.
Figure 7:
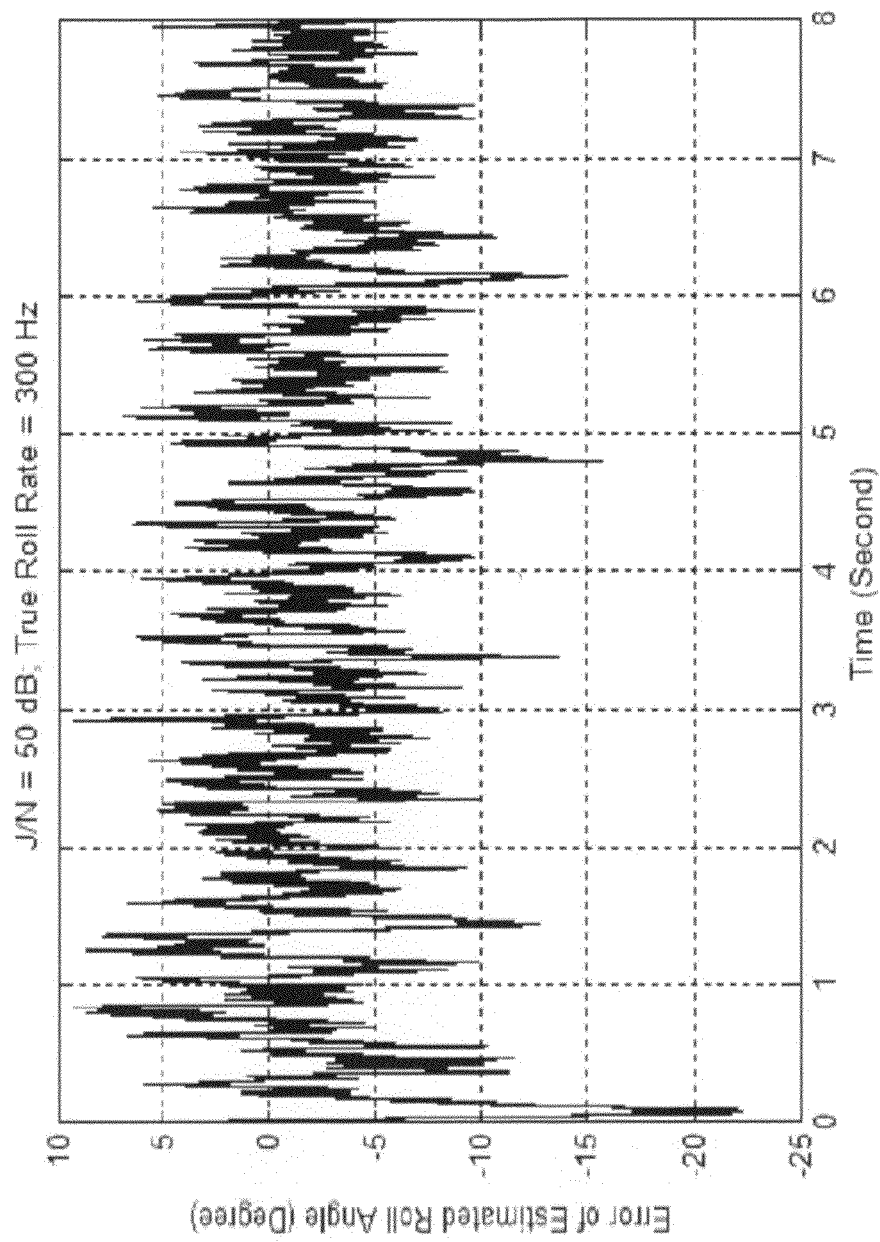
FIG. 7 displays simulation results of error in estimated roll angle in the presence of a broadband jammer.

FIGS. 6 and 7 display, respectively, simulation results of estimated roll rate and error in estimated roll angle in the presence of a broadband jammer using only phase difference processing. The true roll rate is 300 Hz. The jamming-to-noise ratio (J/N) is 50 dB. The angular separation between the satellite and the jammer is 100 degrees. The error of the roll rate estimate is within ±0.3 Hz, and the error of the roll angle estimate is within approximately ±15° under strong jamming. The estimated roll rate and roll angle converge close to the true values in a fraction of one second even under such strong jamming.

Figure 8:
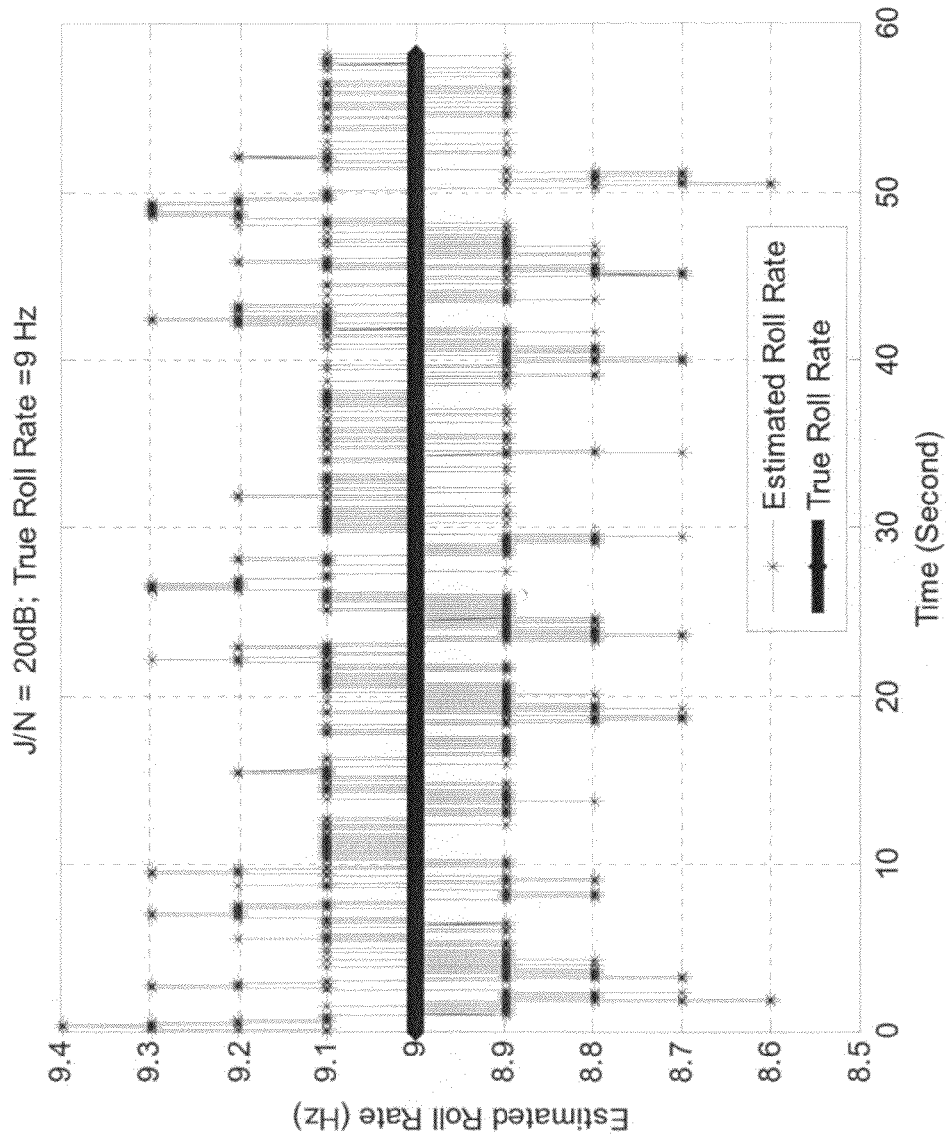
FIG. 8 displays field test results of estimated roll rate in the presence of three continuous wave (CW) jammers using the combined phase and amplitude differences method at 9 Hz spin rate.
Figure 9:
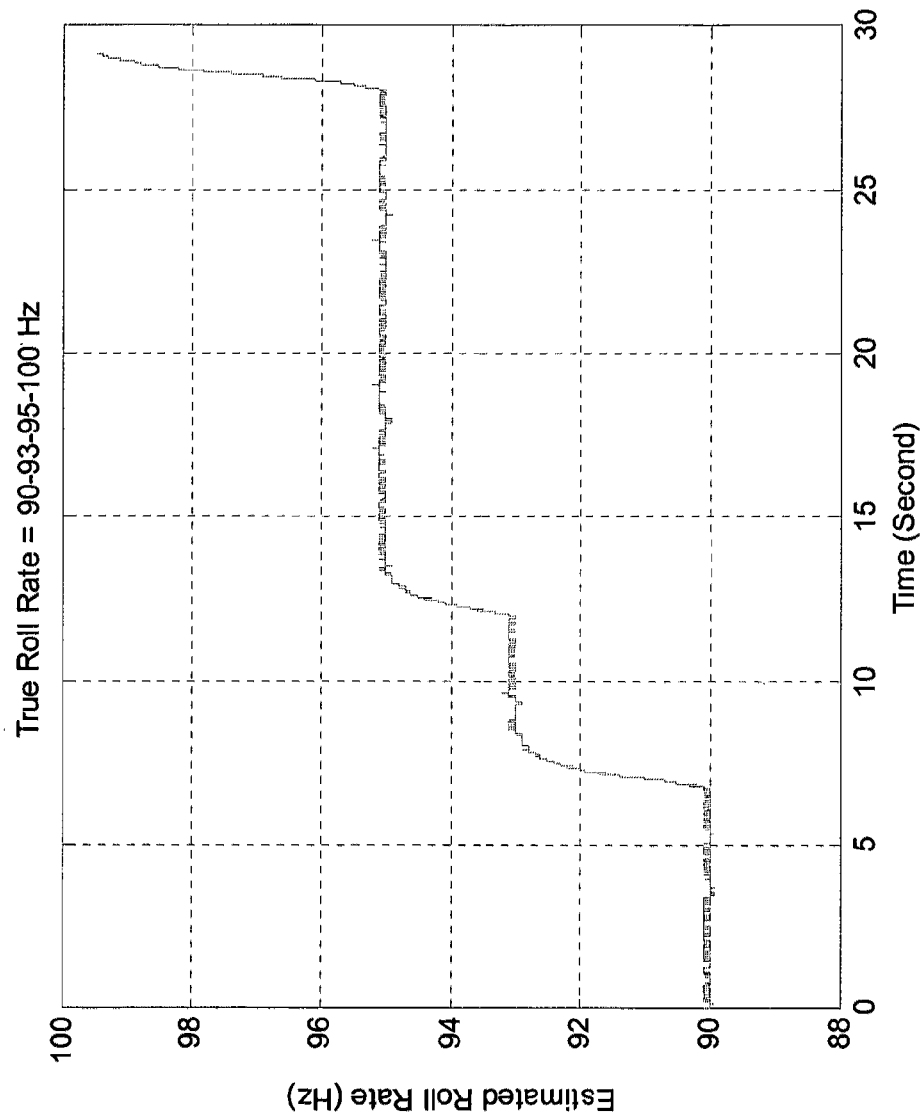
FIG. 9 displays field test results of estimated roll rate in the presence of three CW jammers using the combined phase and amplitude differences method for a stepped spin profile of 90, 93, 95, and 100 Hz.

FIGS. 8 and 9 display the results of outdoor field test measurements of estimated roll rate in the presence of three CW (continuous wave) jammers over durations of 60 and 30 seconds respectively. The jamming-to-noise ratio (J/N) is 26 dB. In both cases, the Roll filter uses both phase and amplitude difference measurements. The true roll rate in FIG. 8 is 9 Hz and the error in the roll rate estimate is within +/−0.3 Hz. FIG. 9 displays the results obtained with a higher spin rate varying profile. The platform spin was incrementally stepped from 90 Hz to 93 Hz, 95 Hz, and 100 Hz. Here too, the error in the roll rate estimate is within +/−0.3 Hz. The Roll filter follows the spin profile closely and has fast convergence to the true roll rate.

We claim:

1. A system for determining the roll rate and roll angle of a spinning platform comprising:
    a plurality of antennas for receiving GPS signals from at least one satellite, each antenna outputting an antenna signal for each received signal;
    a GPS receiver processor for forming the navigation solution; and
    a roll processor, for correlating each of the antenna signals separately, measuring the amplitude differences between the correlated signals from pairs of antennas, and processing the measured amplitude differences and navigation solution in a roll filter that outputs roll information, said roll filter including roll angle as a filter state variable.

2. The system of claim 1, wherein the plurality of antennas comprises at least two antennas.

3. The system of claim 1, wherein the plurality of antennas comprises at least three antennas.

4. The system of claim 1, wherein the roll filter includes a Kalman filter.

5. The system of claim 4, wherein the Kalman filter includes an Extended Kalman Filter.

6. The system of claim 3 wherein the pairs of antennas includes adjacent pairs of antennas.

7. The system of claim 6 wherein the adjacent pairs of antennas includes adjacent pairs of antennas that change with platform roll.

8. The system of claim 1 wherein the navigation solution is formed with the antenna signals.

9. The system of claim 1 wherein the navigation solution is formed with the antenna signals and data from a non-GPS measurement source.

10. The system of claim 1, wherein roll information includes roll angle.

11. The system of claim 1, wherein roll information includes roll rate.

12. The system of claim 1, wherein the roll filter employs a probabilistic data association (PDA) algorithm.

13. A system for determining the roll rate and roll angle of a spinning platform comprising:
    a plurality of antennas for receiving GPS signals from at least one satellite, each antenna outputting an antenna signal for each received signal;
    a GPS receiver processor for forming the navigation solution; and a
    roll processor, for correlating each of the antenna signals separately, measuring the amplitude and phase differences between the correlated signals from pairs of antennas, and processing the measured amplitude and phase differences and navigation solution in a roll filter that outputs roll information, said roll filter including roll angle as a filter state variable.

14. The system of claim 13, wherein the plurality of antennas comprises at least two antennas.

15. The system of claim 13, wherein the plurality of antennas comprises at least three antennas.

16. The system of claim 13, wherein the roll filter includes a Kalman filter.

17. The system of claim 16, wherein the Kalman filter includes an Extended Kalman Filter.

18. The system of claim 15 wherein the pairs of antennas includes adjacent pairs of antennas.

19. The system of claim 18 wherein the adjacent pairs of antennas includes adjacent pairs of antennas that change with platform roll.

20. The system of claim 13 wherein the navigation solution is formed with the antenna signals.

21. The system of claim 13 wherein the navigation solution is formed with the antenna signals and data from a non-GPS measurement source.

22. The system of claim 13, wherein roll information includes roll angle.

23. The system of claim 13, wherein roll information includes roll rate.

24. The system of claim 13, wherein the roll filter employs a probabilistic data association (PDA) algorithm.

25. A method for determining the roll rate and roll angle of a spinning platform comprising the steps of
    receiving GPS signals on a plurality of antennas from at least one satellite and outputting an antenna signal for each received signal;
    forming the navigation solution;
    correlating each of the antenna signals separately;
    measuring amplitude differences between the correlated signals from pairs of antennas; and
    processing the measured amplitude differences and navigation solution in a roll filter that outputs roll information, said roll filter including roll angle as a filter state variable.

26. The method of claim 25, wherein the plurality of antennas comprises at least two antennas.

27. The method of claim 25, wherein the plurality of antennas comprises at least three antennas.

28. The method of claim 25, wherein the roll filter includes a Kalman filter.

29. The method of claim 28, wherein the roll filter includes an Extended Kalman filter.

30. The method of claim 27 wherein the pairs of antennas includes adjacent pairs of antennas.

31. The method of claim 30 wherein the adjacent pairs of antennas includes adjacent pairs of antennas that change with platform roll.

32. The method of claim 25 wherein the navigation solution is formed with the GPS antenna signals.

33. The method of claim 25 wherein the navigation solution is formed with the GPS antenna signals and data from a non-GPS measurement source.

34. The method of claim 25, wherein the roll filter employs a probabilistic data association (PDA) algorithm.

35. A method for determining the roll rate and roll angle of a spinning platform comprising the steps of
    receiving GPS signals on a plurality of antennas from at least one satellite and outputting an antenna signal for each received signal;
    forming the navigation solution;
    correlating each of the antenna signals separately;
    measuring amplitude and phase differences between the correlated signals from pairs of antennas; and processing the measured amplitude and phase differences and navigation solution in a roll filter that outputs roll information, said roll filter including roll angle as a filter state variable.

36. The method of claim 35, wherein the plurality of antennas comprises at least two antennas.

37. The method of claim 35, wherein the plurality of antennas comprises at least three antennas.

38. The method of claim 35, wherein the roll filter includes a Kalman filter.

39. The method of claim 38, wherein the roll filter includes an Extended Kalman filter.

40. The method of claim 37 wherein the pairs of antennas includes adjacent pairs of antennas.

41. The method of claim 40 wherein the adjacent pairs of antennas includes adjacent pairs of antennas that change with platform roll.

42. The method of claim 35 wherein the navigation solution is formed with the GPS antenna signals.

43. The method of claim 35 wherein the navigation solution is formed with the GPS antenna signals and data from a non-GPS measurement source.

44. The method of claim 35, wherein the roll filter employs a probabilistic data association (PDA) algorithm.

* * * * *